(12) United States Patent
Weber et al.

(10) Patent No.: US 8,906,992 B2
(45) Date of Patent: Dec. 9, 2014

(54) MOLDING COMPOSITIONS COMPRISING POLYARYL ETHER WITH IMPROVED SURFACE QUALITY

(75) Inventors: Martin Weber, Maikammer (DE); Rüdiger Bluhm, Limburgerhof (DE); Christian Maletzko, Altrip (DE); Gerhard Lange, Schriesheim (DE); Jörg Erbes, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 206 days.

(21) Appl. No.: 12/666,106

(22) PCT Filed: Jun. 19, 2008

(86) PCT No.: PCT/EP2008/057793
§ 371 (c)(1),
(2), (4) Date: Dec. 22, 2009

(87) PCT Pub. No.: WO2009/000741
PCT Pub. Date: Dec. 31, 2008

(65) Prior Publication Data
US 2010/0184898 A1  Jul. 22, 2010

(30) Foreign Application Priority Data
Jun. 22, 2007  (EP) .................................. 07110844

(51) Int. Cl.
*C08K 5/09* (2006.01)
*C08K 5/098* (2006.01)
*C08K 5/101* (2006.01)
*C08G 75/23* (2006.01)
*C08L 81/06* (2006.01)

(52) U.S. Cl.
CPC .. *C08L 81/06* (2013.01); *C08K 5/09* (2013.01)
USPC ........... 524/322; 524/307; 524/318; 528/174; 528/491

(58) Field of Classification Search
USPC .................. 524/322, 307, 318; 528/174, 491
See application file for complete search history.

(56) References Cited

U.S. PATENT DOCUMENTS

| | | | | |
|---|---|---|---|---|
| 4,156,068 A * | 5/1979 | Hartmann ..................... | 528/175 |
| 4,175,175 A * | 11/1979 | Johnson et al. ............... | 528/125 |
| 4,289,668 A | 9/1981 | Li | |
| 4,520,067 A | 5/1985 | Harris et al. | |
| 4,957,978 A | 9/1990 | Harris | |
| 5,039,575 A * | 8/1991 | Mori et al. .................... | 428/463 |
| 5,631,333 A * | 5/1997 | Weber et al. .................. | 525/535 |
| 6,444,489 B1 * | 9/2002 | Lin ................................ | 438/107 |
| 2003/0139494 A1 | 7/2003 | Weber et al. | |
| 2004/0242807 A1 | 12/2004 | Weber et al. | |
| 2009/0275725 A1 | 11/2009 | Dienes et al. | |
| 2010/0190897 A1 | 7/2010 | Maletzko et al. | |
| 2010/0197859 A1 | 8/2010 | Weber et al. | |
| 2010/0286303 A1 | 11/2010 | Weber et al. | |
| 2011/0009566 A1 | 1/2011 | Jain et al. | |
| 2011/0155309 A1 | 6/2011 | Steininger et al. | |
| 2011/0196098 A1 | 8/2011 | Mettlach et al. | |
| 2011/0201747 A1 | 8/2011 | Weber et al. | |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0251337 A1 | 10/2011 | Weber et al. | |
| 2011/0294912 A1 | 12/2011 | Weber et al. | |
| 2011/0319550 A1 | 12/2011 | Weber et al. | |
| 2012/0029106 A1 | 2/2012 | Weber et al. | |
| 2012/0059109 A1 | 3/2012 | Weber et al. | |

FOREIGN PATENT DOCUMENTS

| | | |
|---|---|---|
| DE | A 2 917 903 | 5/1979 |
| EP | A 127 852 | 5/1984 |
| EP | A 215 580 | 8/1986 |
| EP | 0382409 A | 8/1990 |
| EP | A 663 426 | 1/1995 |
| JP | 06-200157 | 7/1994 |
| JP | 06-200157 A * | 7/1994 |
| WO | WO 2006/037773 A | 4/2006 |
| WO | WO 2009/003901 | 1/2009 |
| WO | WO 2009/034114 | 3/2009 |
| WO | WO 2009/127614 | 10/2009 |
| WO | WO 2010/089241 | 8/2010 |
| WO | PCT/EP2010/069644 | 12/2010 |
| WO | WO 2011/000816 | 1/2011 |
| WO | WO 2011/009798 | 1/2011 |
| WO | WO 2011/051273 | 5/2011 |
| WO | WO 2011/069892 | 6/2011 |
| WO | WO 2011/073196 | 6/2011 |
| WO | WO 2011/073197 | 6/2011 |
| WO | WO 2011/117344 | 9/2011 |

OTHER PUBLICATIONS

U.S. Appl. No. 13/267,628, filed Oct. 6, 2011, Scherzer et al.
U.S. Appl. No. 13/376,665, filed Dec. 7, 2011, Weber et al.
U.S. Appl. No. 13/376,901, filed Dec. 8, 2011, Gibon et al.
U.S. Appl. No. 13/377,979, filed Dec. 13, 2011, Khvorost et al.
U.S. Appl. No. 13/382,782, filed Jan. 6, 2012, Scherzer et al.
U.S. Appl. No. 13/391,082, filed Feb. 17, 2012, Shahim et al.
U.S. Appl. No. 13/378,980, filed Mar. 1, 2012, Schmidt et al.
B G. Blinne et al., Kunststoffe 75, 219 (1985).
E. M. Koch, Kunststoffe 80, 1146 (1990).
E. Doring, Kunststoffe 80, 1149, (1990).

* cited by examiner

*Primary Examiner* — Tae H Yoon
(74) *Attorney, Agent, or Firm* — Drinker Biddle & Reath LLP

(57) ABSTRACT

A thermoplastic molding composition, comprising:
  A) from 40 to 97.9% by weight of at least one polyether sulfone,
  B) from 2 to 59.9% by weight of at least one polysulfone,
  C) from 0.1 to 2% by weight of stearic acid,
and also, if appropriate, further additives and auxiliaries, has improved flowability, surface quality, and notched impact resistance, and can be used for the construction of headlamps.

21 Claims, No Drawings

MOLDING COMPOSITIONS COMPRISING POLYARYL ETHER WITH IMPROVED SURFACE QUALITY

CROSS REFERENCE TO RELATED APPLICATIONS

This application is a national phase of PCT/EP2008/057793, filed on Jun. 19, 2008 which claims priority to EP 07110844.3 filed Jun. 22, 2007, the entire contents of all are hereby incorporated by reference.

Plastics composed of polyaryl ether or using a polyaryl ether component have been known for years and are classified as high-performance thermoplastics. Their high heat resistance and chemical resistance leads to their use in highly stressed applications (see, for example, G. Blinne et al., Kunststoffe 75, 219 (1985); E. M. Koch, Kunststoffe 80, 1146 (1990); E. Döring, Kunststoffe 80, 1149 (1990)). Because of their high glass transition temperature and, associated therewith, the dimensional stability of the moldings, polyaryl ethers are also used for production of headlamp reflectors, e.g. in automobile construction.

The present invention relates to improved molding compositions which comprise polyaryl ethers and which feature high toughness, improved flowability, good melt stability, and high surface quality.

The use of polyether sulfone as a material for production of headlamp reflectors has been known for a long time. This application imposes particular requirements in relation to the flowability and toughness of the thermoplastic compositions, in particular during demolding of the components.

Molding compositions composed of various polyaryl ethers are known from the literature.

EP-A 215 580 describes miscible, i.e. monophasic, blends composed of two or more polyarylene ether sulfones having repeat units composed of the following units:

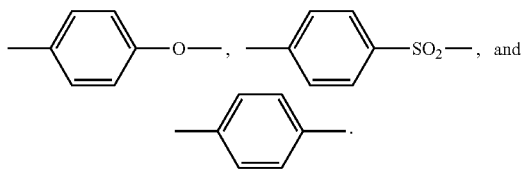

These blends are particularly suitable for the production of printed circuit boards.

DE-A 2 917 903 discloses compositions for the production of semipermeable membranes, which are obtained via mixing of two pulverulent polyarylene ether sulfones, where one is in essence composed of the structural units (I) and the other is in essence composed of structural units (II).

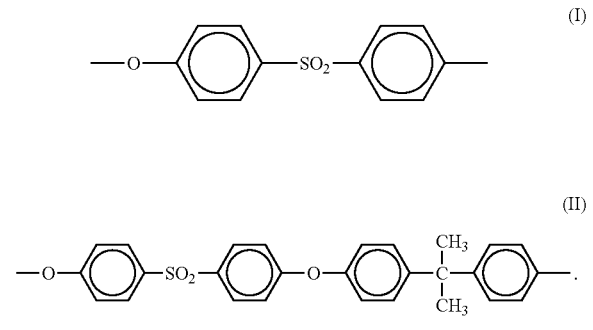

EP-A 127 852 discloses cookware composed of a mixture of polyarylene ether sulfones having the repeat units (III)

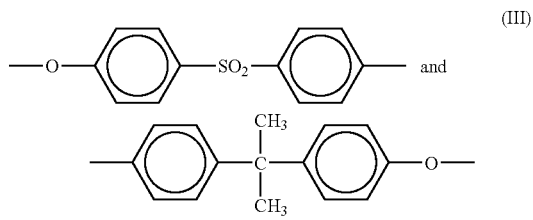

and of those comprising the abovementioned structural units (I) and (II).

EP-A 663 426 moreover discloses blends based on a copolyaryl ether A, composed of from 91 to 97 mol % of structural units (I) and from 3 to 9% by weight of structural units (II) with a disperse phase composed of a copolyaryl ether B, which has from 91 to 97 mol % of structural units (II) and from 3 to 9 mol % of structural units (I). These blends feature improved flowability, reduced tendency toward blistering, and improved chemicals resistance.

However, the flowability and the toughness of the molding compositions described in the prior art are inadequate for applications in the sector of headlamp reflectors.

The patent application JP 06-200157 discloses the use of stearamides for improving the deformability and flexural strength of polyether sulfone.

It is an object of the present invention to provide molding compositions with improved flowability and with good toughness, which can be prepared at low cost.

This object is achieved via provision of a molding composition comprising components A, B, and C, and also, if appropriate, the further components D and E, the entirety of which gives 100% by weight, where the molding composition comprises:

A) from 40 to 97.9% by weight of at least one polyether sulfone,

B) from 2 to 59.9% by weight of at least one polysulfone,

C) from 0.1 to 2% by weight of stearic acid and/or of stearic acid derivatives, and also, if appropriate, D) from 0 to 50% by weight of further additives, E) from 0 to 30% by weight of further auxiliaries.

In a preferred embodiment of the invention the molding composition can comprise from 0.1 to 2.5% by weight of stearic acid and/or of stearic acid derivates.

The invention also provides a molding composition which comprises:

A) from 42.5 to 89.85% by weight of at least one polyether sulfone,

B) from 10 to 57.35% by weight of at least one polysulfone,

C) from 0.1 to 1.75% by weight of stearic acid and/or of stearates, and also, if appropriate, D) from 0 to 20% by weight of further additives, E) from 0 to 15% by weight of further auxiliaries.

The invention further provides a molding composition which comprises:

as component A, specifically from 40 to 97.9% by weight of at least one polyether sulfone whose glass transition temperature is greater than 200° C. and which is preferably composed of repeat units of the formula (I)

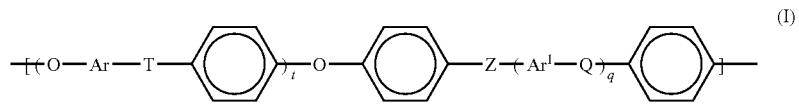
(I)

in which
t and q, independently of one another, are 0, 1, 2, or 3,
each of Q, T, and Z, independently of the others, is a chemical bond or a group, selected from —O—, —S—, —SO$_2$—, S=O, C=O, —N=N—,
    with the proviso that at least one of the groups T, Q, and Z is —SO$_2$— and, if t and q are 0, Z is —SO$_2$,
each of Ar and Ar$^1$, independently of the other, is a C$_6$-C$_{18}$-arylene group, where this can have substitution by C$_1$-C$_{12}$-alkyl groups, by C$_6$-C$_{18}$-aryl groups, by C$_1$-C$_{12}$-alkoxy groups, or by halogen atoms.

The invention also provides a molding composition which comprises:
as component A, specifically from 42.5 to 89.85% by weight of at least one polyether sulfone, composed of repeat units of the formula (I), in which
t and q, independently of each other, are 0, 1, or 2,
each of Q, T, and Z, independently of the others, is a chemical bond or a group, selected from —O— and —SO$_2$—,
    with the proviso that at least one of the groups T, Q, and Z is —SO$_2$— and, if t and q are 0, Z is —SO$_2$, and
each of Ar and Ar$^1$, independently of the other, is a C$_6$-C$_{12}$-arylene group.

The invention also provides a molding composition which comprises, as component B, specifically from 2 to 59.9% by weight of at least one polysulfone, composed of repeat units of the formula (II)

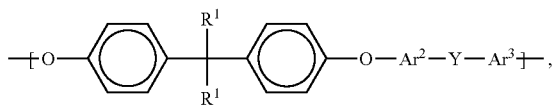
(II)

in which
R$^1$ is H, C$_1$-C$_6$-alkyl, or —(CH$_2$)—COOH,
n is a whole number from 0 to 6,
    each of Ar$^2$ and Ar$^3$, independently of the other, is a C$_6$-C$_{18}$-arylene group, where this can have substitution by one or more C$_1$-C$_{12}$-alkyl, C$_6$-C$_{18}$-aryl, or C$_1$-C$_{12}$-alkoxy groups, or by halogen atoms, and
Y is —SO$_2$—.

The invention also provides a molding composition which comprises:
as component B, specifically from 10 to 57.35% by weight of at least one polysulfone, composed of repeat units of the formula (II), in which
R$^1$ is H or C$_1$-C$_4$-alkyl,
n is a whole number from 0 to 4,
    each of Ar$^2$ and Ar$^3$, independently of the other, is a C$_6$-C$_{12}$-arylene group, and
Y is —SO$_2$—.

Component B often comprises specifically from 10 to 57.35% by weight of at least one polysulfone whose glass transition temperature is from 170 to 195° C., in particular from 175 to 190° C. This polymer is by way of example composed of bisphenol A and dichlorodiphenyl sulfone.

The invention also provides a molding composition which comprises:
as component C, specifically from 0.1 to 1.75% by weight of stearic acid, of stearic acid derivatives, and/or of stearates, where the conventional salts of stearic acid are preferred as stearates, examples being those having metals such as Na, Ca, Mg, or Al.

Among the derivatives of stearic acid, preference is given to the salts.

Specifically, it is preferable that the molding composition comprises, as component C, from 0.1 to 0.9% by weight of stearic acid and/or of stearates. A combination of small amounts of stearic acid with small amounts of stearates, in particular of aluminum, is also suitable. It is desirable to use, as component C, specifically from 0.1 to 0.7% by weight of stearic acid and/or aluminum tristearate. It is preferable that pure stearic acid is used.

The invention also provides a molding composition which comprises:
as component D, specifically from 1 to 40% by weight of further additives from the group of the fillers, reinforcing materials and impact-modified rubbers.

The invention also provides a molding composition which comprises:
    as component D, specifically from 5 to 40% by weight of fibrous and/or particulate fillers.

The invention also provides a molding composition which comprises:
    as component E, specifically from 0.1 to 20% by weight of one or more auxiliaries from the group of the processing aids, pigments, stabilizers, and flame retardants.

The invention also provides a process for the preparation of thermoplastic molding compositions via mixing of components A to C and, if appropriate, components D and E.

The invention also provides the use of molding compositions for production of fibers, of foils, and of moldings, where the molding compositions are used by way of example for the production of household items, of electronic components, of household equipment, of garden equipment, of medical-technology equipment, of motor-vehicle components, and of bodywork parts.

The molding compositions are particularly suitable for the production of headlamps for motor vehicles.

The invention also provides a molding, fibers, and foils composed of a molding composition, an example being a housing for a headlamp (e.g. for a vehicle).

Particularly preference is given to molding compositions which have two glass transition temperatures which differ by at least 10 K.

The inventive molding compositions have improved flowability, better notched impact resistance, and also, surprisingly, improved surface quality. The inventive molding compositions moreover have good processing stability. The molding compositions preferably comprise at least two polymeric phases, and are opaque mixtures.

The inventive molding compositions comprise, as component A, at least one polyether sulfone. It is preferable to use a polyether sulfone corresponding to structural formula (I), in particular with a glass transition temperature above 210° C., e.g. 225° C.

The inventive molding compositions comprise amounts of from 40 to 97.9% by weight, in particular from 42.5 to 89.85% by weight, and particularly preferably from 45 to 84.8% by weight, based on the total weight of components A to E, of component A.

According to the invention, a polyether sulfone is used as component A. It is also possible to use mixtures composed of two or more different poly(arylene) ether sulfones as component A.

based on GB 1 152 035 and U.S. Pat. No. 4,870,153. Suitable process conditions for the synthesis of polyarylene ether sulfones are described by way of example in EP-A 0 113 112 and EP-A 0 135 130. The reaction of the monomers in aprotic polar solvents in the presence of anhydrous alkali metal carbonate is particularly suitable. One particularly preferred combination is N-methylpyrrolidone as solvent and potassium carbonate as catalyst. The reaction in the melt is likewise possible. Examples of suitable polyarylene ether sulfones A are those having at least one of the following structural repeat units $(I_1)$ to $(I_{13})$:

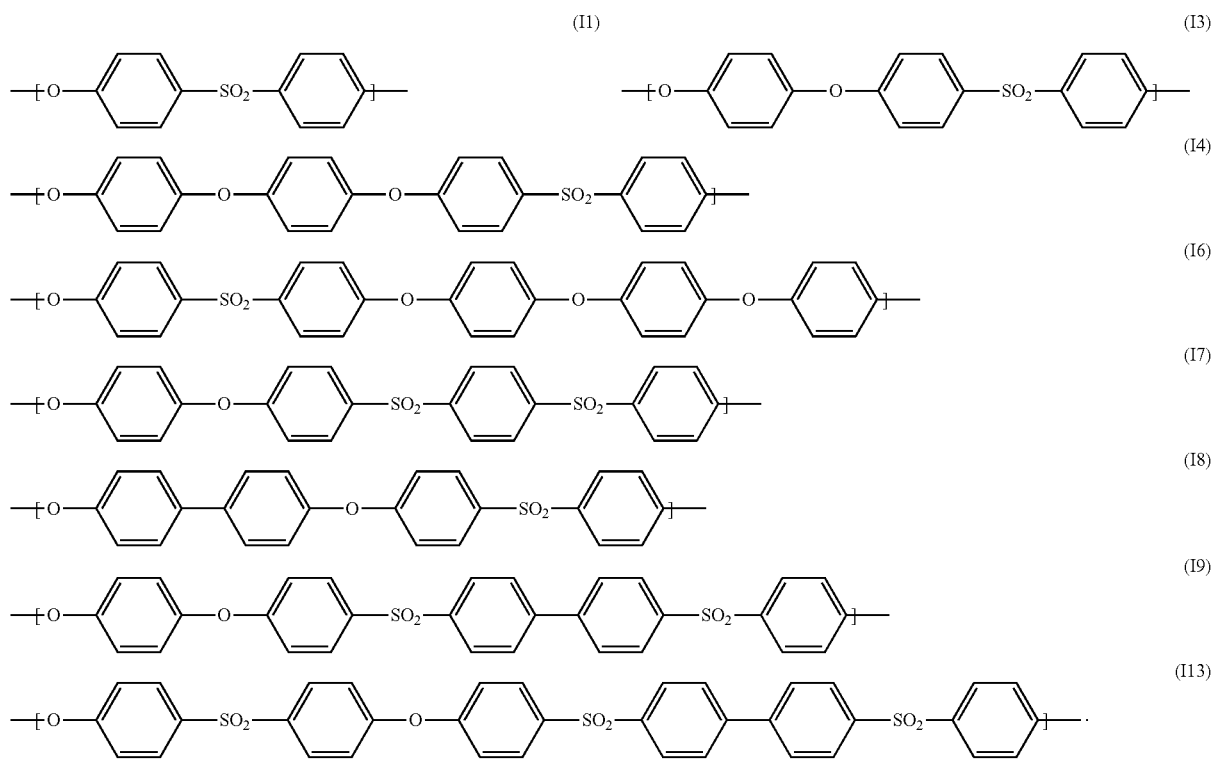

The arylene groups of the polyarylene ether sulfones A here can be identical or different and, independently of one another, can be an aromatic radical having from 6 to 18 carbon atoms. Examples of suitable arylene radicals are phenylene, bisphenylene, terphenylene, 1,5-naphthylene, 1,6-naphthylene, 1,5-anthrylene, 9,10-anthrylene, or 2,6-anthrylene. Among these, preference is given to 1,4-phenylene and 4,4'-biphenylene. It is preferable that these aromatic radicals have no substitution. However, they can bear one or more substituents. Examples of suitable substituents are alkyl, arylalkyl, aryl, nitro, cyano, or alkoxy groups, and also heteroaromatic systems, such as pyridine, and halogen atoms. Among the preferred substituents are alkyl radicals having up to 10 carbon atoms, e.g. methyl, ethyl, isopropyl, n-hexyl isohexyl, $C_1$-$C_{10}$-alkoxy radicals, such as methoxy, ethoxy, n-propoxy, n-butoxy, aryl radicals having up to 20 carbon atoms, e.g. phenyl or naphthyl, and also fluorine and chlorine.

It is also possible that various units of the formula (I) are present distributed randomly or in blocks in the polyarylene ether sulfone, as component A.

Polyether sulfones A that can be used according to the invention can be prepared by way of example by a method The use of a polyarylene ether sulfone A comprising the structural unit $(I_{15})$ is also possible.

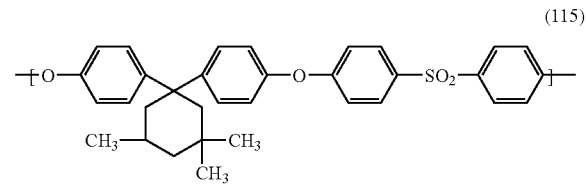

It is particularly preferable that polyaryl ether sulfones of the formula (I1) are used.

As a function of synthesis conditions, the polyarylene ether sulfones can have various groups. These groups can have bonding to atoms of the polymer chain or be present at end groups of the polymer chain.

Among the groups are those which are inert with respect to the other components of the thermoplastic composition, and those which can react with the components.

Among the inert groups are halogen, in particular chloro, alkoxy, and especially methoxy or ethoxy, and aryloxy, preferably phenoxy or benzyloxy, groups.

The average molar masses $M_n$ (number average) of the polyarylene ether sulfones is generally in the range from 5000 to 60 000 g/mol, and their relative viscosities are generally from 0.20 to 0.95 dl/g. As a function of the solubility of the polyarylene ether sulfones, the relative viscosities are measured either in 1% strength by weight N-methylpyrrolidone solution, in a mixture composed of phenol and dichlorobenzene, or in 96% strength sulfuric acid, respectively at 20° C. and 25° C.

The inventive molding compositions comprise, as component B, a polyarylene sulfone. It is preferable that a polyarylene sulfone corresponding to structural formula (II) is used:

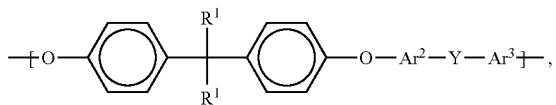

(II)

where
R$^1$ is H, $C_1$-$C_6$-alkyl, or —(CH$_2$)$_n$—COON,
n is a whole number from 0 to 6,
each of Ar$^2$ and Ar$^3$, independently of the other, is a $C_6$-$C_{18}$-arylene group, where this can have substitution by one or more $C_1$-$C_{12}$-alkyl, $C_6$-$C_{18}$-aryl, or $C_1$-$C_{12}$-alkoxy groups, or by halogen atoms, and
Y is —SO$_2$—.

It is preferable that the glass transition temperature of the polyarylene sulfone is from 180° C. to 190° C., in particular 187° C., and it preferably derives from bisphenol A and dihalodiphenyl sulfone.

The inventive molding compositions comprise amounts of from 2 to 59.9% by weight, preferably from 10 to 57.35% by weight, and particularly preferably from 15 to 54.8% by weight, based on the total weight of components A to E, of component B.

The average molar masses $M_n$ (number average) of the polyarylene ether sulfones (number average) is generally in the range from 5000 to 60 000 g/mol, and their relative viscosities are generally from 0.20 to 0.95 dl/g. As a function of the solubility of the polyarylene ether sulfones, the relative viscosities are measured either in 1% strength by weight N-methylpyrrolidone solution, in a mixture composed of phenol and dichlorobenzene, or in 96% strength sulfuric acid, respectively at 20° C. and 25° C.

The inventive molding compositions comprise, as component C, from 0.1 to 2% by weight, preferably from 0.1 to 1.75% by weight, particularly preferably from 0.1 to 1.5% by weight, and in particular from 0.1 to 0.9% by weight (based on the entire molding composition) of stearic acid and/or of stearates.

In principle other stearic acid derivatives can also be used, examples being esters of stearic acid.

Stearic acid is preferably prepared via hydrolysis of fats. The resulting products are usually mixtures composed of stearic acid and palmitic acid. These products therefore have a wide softening range, for example from 50 to 70° C., as a function of the constitution of the product. It is preferable that products used have stearic acid content of more than 20% by weight, particularly preferably more than 25% by weight. It is also possible to use pure stearic acid (>98%).

Stearates can moreover be used as component C. Stearates can be prepared either via reaction of corresponding sodium salts with metal salt solutions (e.g. CaCl$_2$, MgCl$_2$, aluminum salts, etc.) or via direct reaction of the fatty acid with metal hydroxide (see, for example, Baerlocher Additives, 2005). It is preferable that aluminum tristearate is used.

The inventive thermoplastic molding compositions comprise, as component D, from 0 to 50% by weight, preferably from 0 to 45% by weight, and in particular from 0 to 40% by Weight, of additives, such as fillers and reinforcing materials, or impact-modified rubbers.

The molding compositions can also comprise auxiliaries, e.g. processing aids, pigments, stabilizers, or a mixture of various additives.

The molding compositions preferably comprise from 0 to 45% by weight, in particular from 0 to 40% by weight, of fibrous or particulate fillers or reinforcing materials, or a mixture of these. The amounts stated are always based on the total weight of components A to E.

Preferred fibrous fillers or fibrous reinforcing materials are carbon fibers, potassium titanate whiskers, aramide fibers, and particularly glass fibers. If glass fibers are used, these may have been equipped with a size, preferably a polyurethane size, and with a coupling agent, to improve compatibility with the matrix material. The diameter of the carbon fibers and glass fibers used is generally in the range from 6 to 20 µm.

The form in which the glass fibers are incorporated can either be that of short glass fibers or else that of continuous-filament strands (rovings). The average length of the glass fibers in the finished injection molding is preferably in the range from 0.08 to 0.5 mm. Other forms in which carbon fibers or glass fibers can be used are those of wovens, mats, or glass-silk rovings.

Suitable particulate fillers are amorphous silica, carbonates, such as magnesium carbonate (chalk), powdered quartz, mica, a very wide variety of silicates, such as clays, muscovite, biotite, suzoit, tin maletite, talc, chlorite, phlogopite, feldspar, calcium silicates, such as wollastonite, or aluminum silicates, such as kaolin, particularly calcined kaolin.

According to another embodiment, particulate fillers are used in which the diameter (largest dimension) of at least 95% by weight, preferably at least 98% by weight, of the particles, determined on the finished product, is less than 45 µm, preferably less than 40 µm, and the value known as their aspect ratio is in the range from 1 to 25, preferably in the range from 2 to 20, determined on the finished product.

The particle diameters here can be determined, for example, by taking electron micrographs of thin layers of the polymer mixture and basing the evaluation on at least 25, preferably at least 50, filler particles. Particle diameter can also be determined by way of sedimentation analysis, as in Transactions of ASAE, page 491 (1983). The proportion by weight of the fillers below 40 µm can also be measured by means of sieve analysis. The aspect ratio is the ratio of particle diameter to thickness (largest dimension to smallest dimension).

Particulate fillers particularly preferred are talc, kaolin, such as calcined kaolin, or wollastonite, or a mixture composed of two or of all of these fillers. Among these, particular preference is given to talc whose proportion of particles with diameter smaller than 40 mm and with aspect ratio of from 1.5 to 25, in each case determined on the finished product, is at least 95% by weight. Kaolin preferably has a proportion of at least 95% by weight of particles whose diameter is smaller than 20 µm and whose aspect ratio is from 1.2 to 20, in each case determined on the finished product.

The inventive molding compositions can also comprise, as further component E, auxiliaries, such as processing aids, pigments, stabilizers, flame retardants, or a mixture of various additives. Other examples of conventional additives are oxidation retarders, agents to counteract decomposition by heat and decomposition by ultraviolet light, lubricants and Mold-release agents, dyes, and plasticizers.

Their proportion according to the invention is from 0 up to 30% by weight, preferably from 0 up to 20% by weight, in particular from 0 to 15% by weight, based on the total weight of components A to E. If component E involves stabilizers, the proportion of these stabilizers is usually up to 2% by weight, preferably from 0.01 to 1% by weight, in particular from 0.01 to 0.5% by weight, based on the total weight of A to E.

The amounts generally comprised of pigments and dyes are up to 6% by weight, preferably from 0.05 to 5% by weight, and in particular from 0.1 to 3% by weight, based on the entirety of A to E.

Pigments for the coloring of thermoplastics are well known, see by way of example R. Gächter and H. Müller, Taschenbuch der Kunststoffadditive [Plastics additives handbook], Carl Hanser Verlag, 1983, pp. 494 to 510. A first preferred group of pigments that may be mentioned is that of white pigments, such as zinc oxide, zinc sulfide, white lead (2 $PbCO_3.Pb(OH)_2$), lithopones, antimony white, and titanium dioxide. Among the two most familiar crystalline forms of titanium dioxide (rutile and anatase) it is the rutile form that is particularly used for white coloration of the inventive molding compositions. Examples of black color pigments that can be used according to the invention are iron oxide black ($Fe_3O_4$), spinell black [$Cu(Cr, Fe)_2O_4$], manganese black (a mixture composed of manganese dioxide, silicon oxide, and iron oxide), cobalt black, and antimony black, and particularly preferably carbon black, which is mostly used in the form of furnace black or gas black (in which connection see G. Benzing, Pigmente für Anstrichmittel [Pigments for paints], Expert-Verlag (1988), pp. 78 et seq.).

To achieve particular shades it is, of course, possible to use inorganic chromatic pigments, such as chromium oxide green, or organic chromatic pigments, such as azo pigments or phthalocyanines. Pigments of this kind are widely available commercially.

Examples of oxidation retarders and heat stabilizers that can be added to the thermoplastic compositions according to the invention are halides of metals of group I of the periodic table of the elements, for example sodium halides, potassium halides or lithium halides, for example chlorides, bromides or iodides. It is also possible to use zinc fluoride and zinc chloride. It is also possible to use sterically hindered phenols, hydroquinones, substituted representatives of this group, secondary aromatic amines, if appropriate in conjunction with phosphorus-containing acids and, respectively, their salts, and mixtures of these compounds, preferably in concentrations of up to 1% by weight, based on the weight of the mixture A to F.

Examples of suitable UV stabilizers are various substituted resorcinols, salicylates, benzotriazoles, and benzophenones, usually used in amounts of up to 2% by weight.

Lubricants and mold-release agents, the amounts added of which are generally up to 1% by weight of the thermoplastic composition, are stearyl alcohol, alkyl stearates, stearamides, and also esters of pentaerythritol with long-chain fatty acids. It is also possible to use dialkylketones, e.g. distearyl ketone.

Other additives that can be used are those known as nucleating agents, such as talc.

The inventive molding compositions can be prepared by processes known per se, for example by means of extrusion. By way of example, the molding compositions can be prepared by mixing the starting components A, B, and C, and also, if appropriate, D and E, in conventional mixing apparatuses, such as screw extruders, preferably twin-screw extruders, Brabender mixers or Banbury mixers, or also kneaders, and then extruding them. The extrudates is usually cooled and comminuted.

The inventive molding compositions can also preferably be prepared by a process wherein components A and B are precipitated from a solution comprising the components in a solvent (S) (e.g. N-methylpyrrolidone) and then extracted if appropriate, and wherein only then does mixing take place with component C and also, if appropriate, with components D and E, in conventional mixing apparatuses, the mixture then being extruded.

The sequence of mixing of these components can be varied, and for example two or, if appropriate, three components can be premixed, but it is also possible to mix all of the components together.

Components A and B can be premixed while still in solution. Addition of components C and, if appropriate, D and E takes place by way of the molten state.

Intensive mixing is advantageous in order to obtain a molding composition of maximum homogeneity. Average mixing times necessary for this are generally from 0.2 to 30 minutes, in particular from 1 to 20 minutes, at temperatures of from 280° to 420°, preferably from 290° to 380° C.

The inventive molding compositions feature good flowability, improved toughness, especially tensile strain at break and notched impact resistance, and improved surface quality. The inventive molding compositions are therefore suitable for the production of moldings for household items, for electrical or electronic components, and also for moldings for the vehicle sector.

the examples below illustrate the invention.

EXAMPLES

Properties of Molding Compositions

The viscosity number of the polyaryl ether sulfones is determined in 1% strength N-methylpyrrolidone solution at 25° C.

The heat resistance of the specimens was determined to ISO 306 (Vicat B) (50 N load, 50 K per hour temperature rise, on ISO specimens).

The notched impact resistance of the products was determined to ISO 179 1 eB.

The tensile strain at break of the materials was determined to ISO 527. The flowability of the products was determined via measurement in a capillary rheometer at 370° C.

Surface quality was determined visually on plaques of dimension 60×60×2 mm, and classified by the school-grade system from 1 (very good) to 6 (unsatisfactory).

The melt stability of the products was determined via measurement of melt viscosity in a Capillary rheometer at 400° C. The change in viscosity determined at 55 Hz is observed over a period of 60 minutes.

$$\Delta = \frac{\eta_{60'} - \eta_{5'}}{\eta_{5'}}$$

$\eta_{60'}$: viscosity after 60 min
$\eta_{5'}$: viscosity after 5 min

Component A1

An example of polyaryl ether sulfone used is Ultrason® E 2010 (from BASF Aktiengesellschaft, characterized by a glass transition temperature of 225° C. and a viscosity number of 55 ml/g).

Component B1

An example of a polysulfone used is Ultrason®S 2010 (from BASF Aktiengesellschaft, characterized by a glass transition temperature of 187° C. and a viscosity number of 63 ml/g).

Component C1

Commercially available stearic acid, characterized by a softening range of from 55 to 60° C. and an acid number of from 200 to 212 mg KOH/g is used as component C1.

Component C2

Aluminum tristearate is used as component C2. Tests were also carried out with calcium stearate and magnesium stearate, and aluminum stearate proved particularly successful here.

Component D

A fine-particle talc is used as component D. The product used features $X_{10}=1.7$ μm and $X_{90}=10.8$ μm (determined via laser scattering, where the mineral was homogenized in a suspension cell in deionized water/1% CV-K8 surfactant mixture, magnetic stirrer, rotation rate 60 rpm).

Preparation of Molding Compositions

Components A1, B1, and C were mixed in a twin-screw extruder (ZSK 30 from Coperion) at a barrel temperature of 350° C., and pelletized.

The pellets were used to injection-mold test specimens for mechanical tests. The melt temperature used was 350° C., and the mold-surface temperature was 140° C.

TABLE 1

| | Test | | | | | | | |
|---|---|---|---|---|---|---|---|---|
| | T1 | T2 | T3 | T4 | T5 | T6 | T7 | T8 |
| Component A1 | 100 | 80 | 79.8 | 70 | 69.8 | 60 | 59.8 | 99.8 |
| Component B1 | — | 20 | 20 | 30 | 30 | 40 | 40 | — |
| Component C1 | — | — | 0.2 | — | 0.2 | — | 0.2 | 0.2 |
| Vicat B [° C.] | 224 | 220 | 219 | 218 | 218 | 217 | 215 | 223 |
| Viscosity at 1000 Hz [Pa * s] | 335 | 287 | 284 | 263 | 259 | 246 | 245 | 331 |
| Tensile strain [%] | 14.2 | 27.2 | 47 | 28.6 | 51.0 | 28.6 | 45.1 | 16.1 |
| Melt stability | 1.27 | 1.44 | 1.40 | 1.51 | 1.41 | 1.52 | 1.42 | 1.30 |
| ISO 179 1eB [kJ/m²] | 46 | 120 | 150 | 94 | 127 | 78 | 108 | 47 |
| Surface quality | 2 | 3 | 2 | 3 | 2 | 3.5 | 2.5 | 2 |

TABLE 2

| | Test | | | | | | | |
|---|---|---|---|---|---|---|---|---|
| | T9 | T10 | T11 | T12 | T13 | T14 | T15 | T16 |
| Component A1 | 75 | 74.95 | 74.9 | 74.8 | 72.5 | 69.8 | 60 | 60 |
| Component B1 | 25 | 25 | 25 | 25 | 25 | 30 | 30 | 30 |
| Component C1 | — | 0.05 | 0.1 | 0.2 | 2.5 | — | — | 0.2 |
| Component C2 | — | — | — | — | — | 0.2 | — | — |
| Component D | — | — | — | — | — | — | 10 | 10 |
| Vicat B [° C.] | 219 | 219 | 219 | 219 | 214 | 218 | 218 | 218 |
| Viscosity at 1000 Hz [Pa * s] | 275 | 275 | 273 | 271 | 214 | 259 | 310 | 305 |
| Tensile strain [%] | 32.0 | 30.4 | 36.0 | 44.5 | 33.4 | 56.5 | 13.5 | 35.2 |
| Melt stability | 1.44 | 1.46 | 1.38 | 1.37 | 0.16 | 1.39 | 1.56 | 1.47 |
| ISO 179 1eB [kJ/m²] | 112 | 114 | 145 | 151 | 87 | 165 | 67 | 98 |
| Surface quality | 3 | 3 | 2 | 2 | 3 | 2 | 3.5 | 2.5 |

The invention claimed is:

1. A thermoplastic molding composition, comprising:
   A) from 45 to 84.8% by weight of at least one polyether sulfone whose glass transition temperature is greater than 200° C. and comprising repeat units of the formula (I):

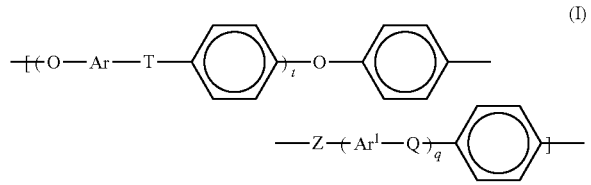

in which
   t and q, independently of one another, are 0, 1, 2, or 3,
   each of Q, T, and Z, independently of the others, is a chemical bond or a group, selected from —O—, —S—, —SO$_2$—, S=O, C=O, N=N—,
   with the proviso that at least one of the groups T, Q and Z is —SO$_2$— and, if t and q are 0, Z is —SO$_2$—,
   each of Ar and Ar$^1$, independently of the other, is a C$_6$-C$_{18}$-arylene group, where this can have substitution by C$_1$-C$_{12}$-alkyl groups, by C$_6$-C$_{18}$-aryl groups, by C$_1$-C$_{12}$-alkoxy groups or by halogen atoms,
   B) from 15 to 54.8% by weight of at least one polysulfone having a glass transition temperature from 170° C. to 195° C. and comprising repeat units of the formula (II):

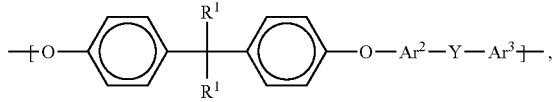

in which
   R$^1$ is H or C$_1$-C$_4$-alkyl,
   each of Ar$^2$ and Ar$^3$, independently of the other, is a C$_6$-C$_{12}$-arylene group, and
   Y is —SO$_2$—,
   C) from 0.1 to 1.75% by weight of stearic acid, salts of stearic acid, esters of stearic acid, and/or stearates.

2. The molding composition according to claim 1, which comprises, as component A, from 45 to 84.8% by weight of at least one polyether sulfone, composed of repeat units of the formula (I), in which
   t and q, independently of each other, are 0, 1, or 2,
   each of Q, T, and Z, independently of the others, is a chemical bond or a group, selected from —O— and —SO$_2$—, with the proviso that at least one of the groups T, Q, and Z is —SO$_2$— and, if t and q are 0, Z is —SO$_2$—, and
   each of Ar and Ar$^1$, independently of the other, is a C$_6$-C$_{12}$-arylene group.

3. The molding composition according to claim 1, which comprises, as component B, at least one polysulfone which is composed of bisphenol A and dichlorodiphenyl sulfone.

4. The molding composition according to claim 1, which comprises, as component C, from 0.1 to 1.75% by weight of stearic acid and/or of stearates.

5. The molding composition according to claim 1, which comprises, as component C, from 0.1 to 0.9% by weight of stearic acid and/or of stearates.

6. The molding composition according to claim 1, which comprises, as component C, from 0.1 to 0.7% by weight of stearic acid and/or aluminum tristearate.

7. The molding composition according to claim 1, which further comprises, as component D, from 1 to 40% by weight of further additives from the group of the fillers, reinforcing materials, and impact-modified rubbers.

8. The molding composition according to claim 1, which further comprises, as component D, from 5 to 40% by weight of fibrous and/or particulate fillers.

9. The molding composition according to claim 1, which further comprises, as component E, from 0.1 to 20% by weight of one or more auxiliaries from the group of the processing aids, pigments, stabilizers, and flame retardants.

10. A process for the preparation of thermoplastic molding compositions according to claim 1, comprising mixing of a mixture comprising components A to C.

11. The process for preparation according to claim 10, wherein components A and B are precipitated from a solution comprising the components in a solvent (S), and only then does mixing take place with component C in conventional mixing apparatuses, the mixture then being extruded.

12. A method of using molding compositions according to claim 1 for producing fibers, foils, and/or moldings.

13. A method of using molding compositions according to claim 12 for producing household items, electronic components, household equipment, garden equipment, medical-technology equipment, motor-vehicle components, and/or bodywork parts.

14. A method of using molding compositions according to claim 12 for the production of headlamps for motor vehicles.

15. A molding, fiber, or foil composed of a molding composition according to claim 1.

16. The molding according to claim 15, comprising a housing for a headlamp.

17. The molding composition of claim 1 further comprising, as component D, additives selected from the group consisting of: fillers, reinforcing materials, and impact-modified rubbers.

18. The molding composition of claim 1 further comprising, as component E, auxiliaries selected from the group consisting of processing aids, pigments, stabilizers, and flame retardants.

19. The molding composition of claim 1, which comprises
   from 59.8 to 79.8% by weight of component A and
   from 20 to 40% by weight of component B.

20. The molding composition according to claim 19, which comprises, as component C, from 0.1 to 1.75% by weight of stearic acid.

21. The molding composition of claim 1, which consists essentially of
   from 59.8 to 79.8% by weight of component A,
   from 20 to 40% by weight of component B, and
   from 0.1 to 1.75% by weight of stearic acid as component C.

* * * * *